(12) United States Patent
Babineau et al.

(10) Patent No.: US 7,581,211 B2
(45) Date of Patent: Aug. 25, 2009

(54) METHOD AND APPARATUS FOR ON DEMAND DEBUGGING, TRACING, AND LOGGING OF APPLICATIONS

(75) Inventors: Sean Eric Babineau, North York (CA); Vadim Berestetsky, North York (CA); Xuan Zhang Chen, Toronto (CA); Li Ding, North York (CA)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/890,665

(22) Filed: Jul. 14, 2004

(65) Prior Publication Data

US 2006/0015853 A1 Jan. 19, 2006

(51) Int. Cl.
*G06F 9/44* (2006.01)
(52) U.S. Cl. .................. 717/131; 717/129
(58) Field of Classification Search ......... 717/127–131; 709/223
See application file for complete search history.

(56) References Cited

U.S. PATENT DOCUMENTS

| | | | |
|---|---|---|---|
| 4,819,233 A | 4/1989 | Delucia et al. | 717/129 |
| 5,388,268 A | 2/1995 | Beach et al. | 717/127 |
| 5,522,036 A | 5/1996 | Shapiro | 714/38 |
| 5,636,376 A | 6/1997 | Chang | 717/127 |
| 5,675,798 A | 10/1997 | Chang | 709/224 |
| 5,740,371 A | 4/1998 | Wallis | 709/229 |
| 5,845,125 A * | 12/1998 | Nishimura et al. | 717/129 |
| 6,016,558 A * | 1/2000 | Seong et al. | 714/45 |
| 6,202,199 B1 * | 3/2001 | Wygodny et al. | 717/125 |
| 6,219,782 B1 * | 4/2001 | Khan et al. | 712/227 |
| 6,263,456 B1 | 7/2001 | Boxall et al. | 714/31 |
| 6,324,683 B1 * | 11/2001 | Fuh et al. | 717/124 |
| 6,349,342 B1 | 2/2002 | Menges et al. | 719/316 |
| 6,378,125 B1 | 4/2002 | Bates et al. | 717/129 |
| 6,587,967 B1 | 7/2003 | Bates et al. | 714/35 |
| 6,658,650 B1 * | 12/2003 | Bates | 717/127 |
| 6,754,346 B2 | 6/2004 | Eiserling | 714/42 |
| 6,754,890 B1 | 6/2004 | Berry et al. | 717/128 |
| 6,842,893 B1 * | 1/2005 | Sangavarapu et al. | 717/129 |
| 7,120,901 B2 * | 10/2006 | Ferri et al. | 717/128 |
| 7,350,194 B1 * | 3/2008 | Alpern | 717/124 |
| 7,441,234 B2 * | 10/2008 | Cwalina et al. | 717/128 |

(Continued)

FOREIGN PATENT DOCUMENTS

JP 2001034583 A 2/2001

OTHER PUBLICATIONS

"Design Considerations in Monitoring Web-Based Information Retrieval Systems", Journal of the American Society for Information Science vol. 49, No. 10 p. 903-919.

*Primary Examiner*—Tuan Q Dam
*Assistant Examiner*—Isaac T Tecklu
(74) *Attorney, Agent, or Firm*—Yee & Associates; Jeanine S. Ray-Yarletts

(57) ABSTRACT

On demand tracking of applications is provided by a mechanism of the present invention. After a user selects one or more units of execution of interest, a marker is assigned to each target object. Upon invocation of an application, an event is sent to an event handler if at least one target object is executed. The event handler gathers a process identifier and initiates a debugging, tracing or logging of the process on a target system.

19 Claims, 8 Drawing Sheets

U.S. PATENT DOCUMENTS

| | | | |
|---|---|---|---|
| 2002/0087949 A1* | 7/2002 | Golender et al. | 717/124 |
| 2003/0177421 A1* | 9/2003 | Baker et al. | 714/48 |
| 2005/0216895 A1* | 9/2005 | Tran | 717/127 |

* cited by examiner

FIG. 6

| iSeries Service Entry Points | | | | | | | |
|---|---|---|---|---|---|---|---|
| Library | Program | Program Type | Module | Procedure | User ID | Connection | Enabled |
| EWCPP | DRIVACCT | *PGM | *ALL | *ALL | user1 | toras48f | Yes |
| EW37TEST | EWICBL001 | *PGM | *ALL | *ALL | user2 | toras48f | Yes |
| EW37TEST | EWICBL002 | *PGM | *ALL | *ALL | user3 | toras48f | Yes |

METHOD AND APPARATUS FOR ON DEMAND DEBUGGING, TRACING, AND LOGGING OF APPLICATIONS

BACKGROUND OF THE INVENTION

1. Technical Field

The present invention relates to an improved data processing system. In particular, the present invention relates to debugging, tracing, and logging of applications in a data processing system. Still more particularly, the present invention relates to on demand debugging, tracing and logging of applications in a data processing system without knowledge of a process identifier or inserting waits in the applications.

2. Description of Related Art

In modern development environment, software developers often face different challenges with regard to debugging or tracing programs that they developed. Using existing integrated development environments (IDEs), software developers may debug their programs in several ways. One way is by initiating a debug session manually and setting an 'On load' break point for the process of interest in the program during the debug session. A break point is a location, such as a line in the source code, where a software developer may want to begin debugging or tracking. Another way of debugging is by setting break points for the process of interest ahead of time and initiating the debug session, which pauses execution of the program when the break points are encountered.

However, these approaches require software developers to have knowledge of a process identifier of the process of interest prior to initiating the debug session. Particularly, software developers who are developing programs within a Web application environment or a generic server-based environment face even more challenges in identification of this process identifier, since a Web server may spawn new processes to handle user requests which have different process identifiers that are not known by software developers and at times that are unknown to software developers.

Facing this challenge, some software developers modify their program code by inserting waits. A wait is a method that causes the current process to wait until notification by another process. With waits inserted, the process identifier may be identified and the debug process may be initiated when a new process is created by the Web server. However, this approach is not efficient for software developers, because the program code has to be modified in order to determine the process identifier.

Traditionally, software developers start the debugging or tracing of applications at some time earlier than a problem area, which affects overall system performance. In addition, current IDEs only allow software developers to specify artifacts, such as, for example, servlets or enterprise Java™ beans, to be registered by the system, such that when these artifacts are executed, the software developers are notified. However, there is no existing mechanism that allows software developers to specify more granular units of execution or entries to be registered with the system. A unit of execution may be a library, a program or a module.

Furthermore, there is no existing mechanism that allows software developers to specify a user of interest in a single server environment accessed by multiple users, who wants to perform debugging, tracing or logging of applications.

Therefore, it would be advantageous to have an improved method and apparatus for debugging, tracing, and logging of applications or programs without the knowledge of the process identifier ahead of time and inserting waits in the applications. It would also be advantageous to have an improved method and apparatus that allows software developers to start debugging, tracing or logging when specific programs or modules are invoked or when specific libraries are loaded.

Moreover, it would be advantageous to have an improved method and apparatus to keep track of a specific user when multiple users are debugging within a single server environment, as long as the server spawns different processes for different user requests.

BRIEF SUMMARY OF THE INVENTION

A method, apparatus and computer instructions is provided for on demand debugging, tracing and logging of applications. The mechanism of the present invention provides a list of target objects identified on a data processing system, detects selection of one or more units of execution of interest from the list of target objects, and assigns a marker to each target object in the set of selected target objects. Upon detecting an event from a server triggered by a process executing at least one target object from the set of selected target objects, the mechanism of the present invention invokes an event handler to gather information from the process and sends the information to a development environment in order to start a debug session, a trace, or log to a file.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating an exemplary list of service entry points assigned in accordance with a preferred embodiment of the present invention;

DETAILED DESCRIPTION OF THE INVENTION

Figure 1:
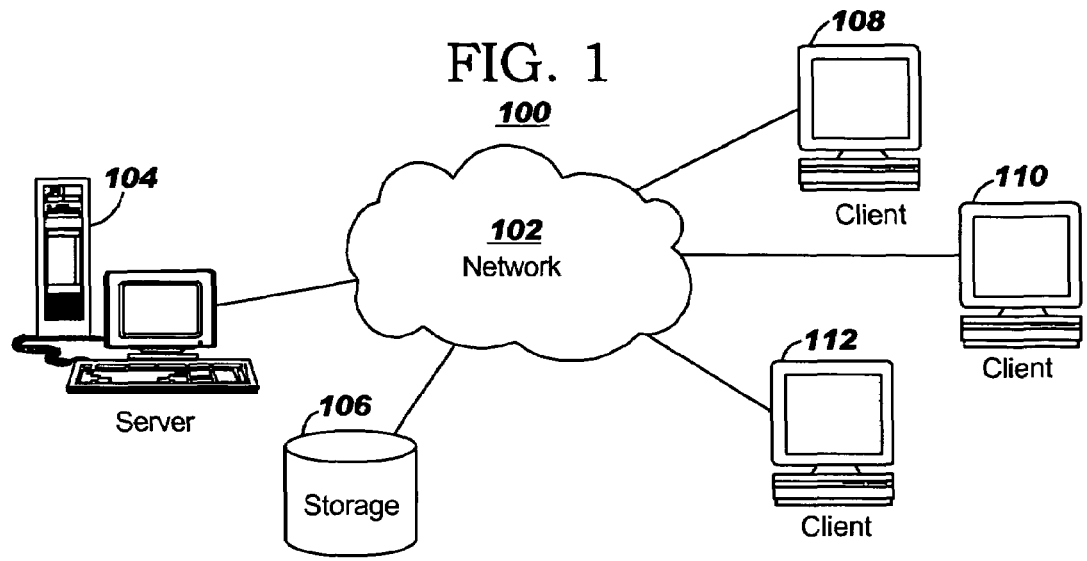
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
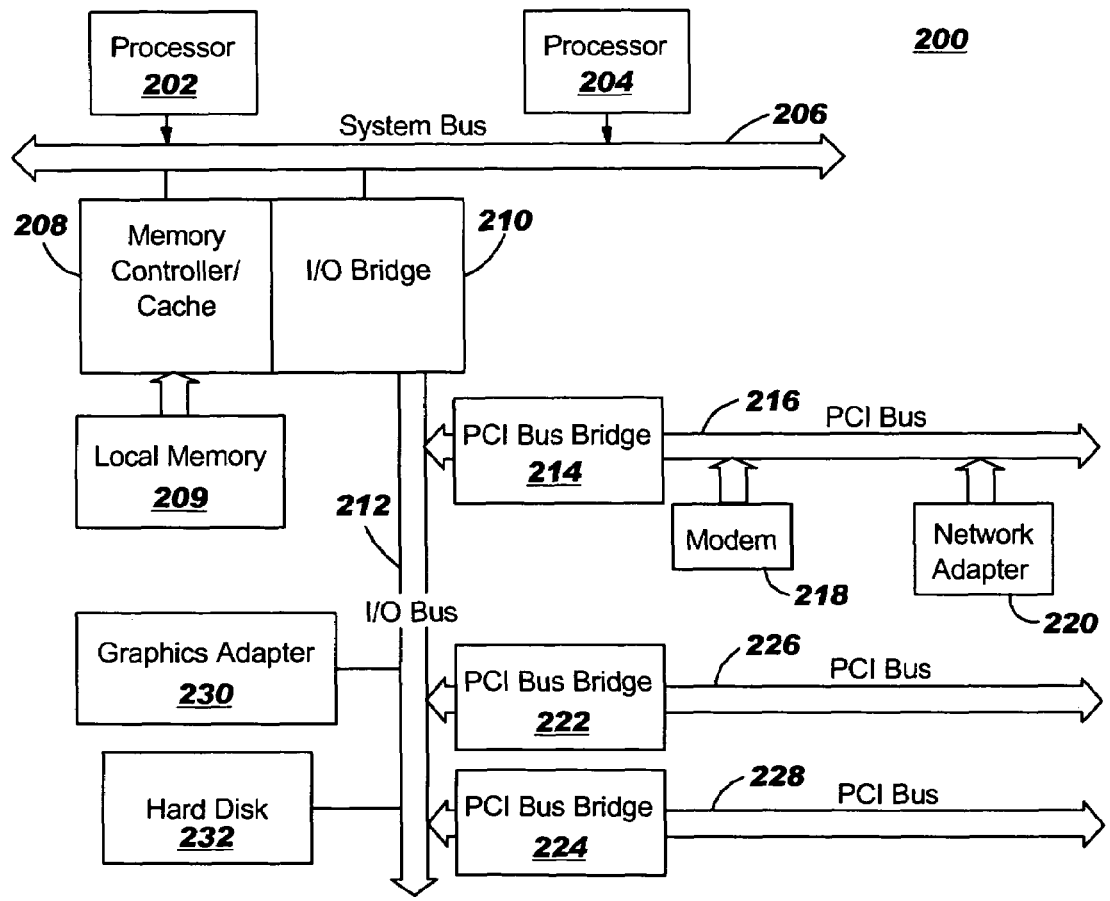
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
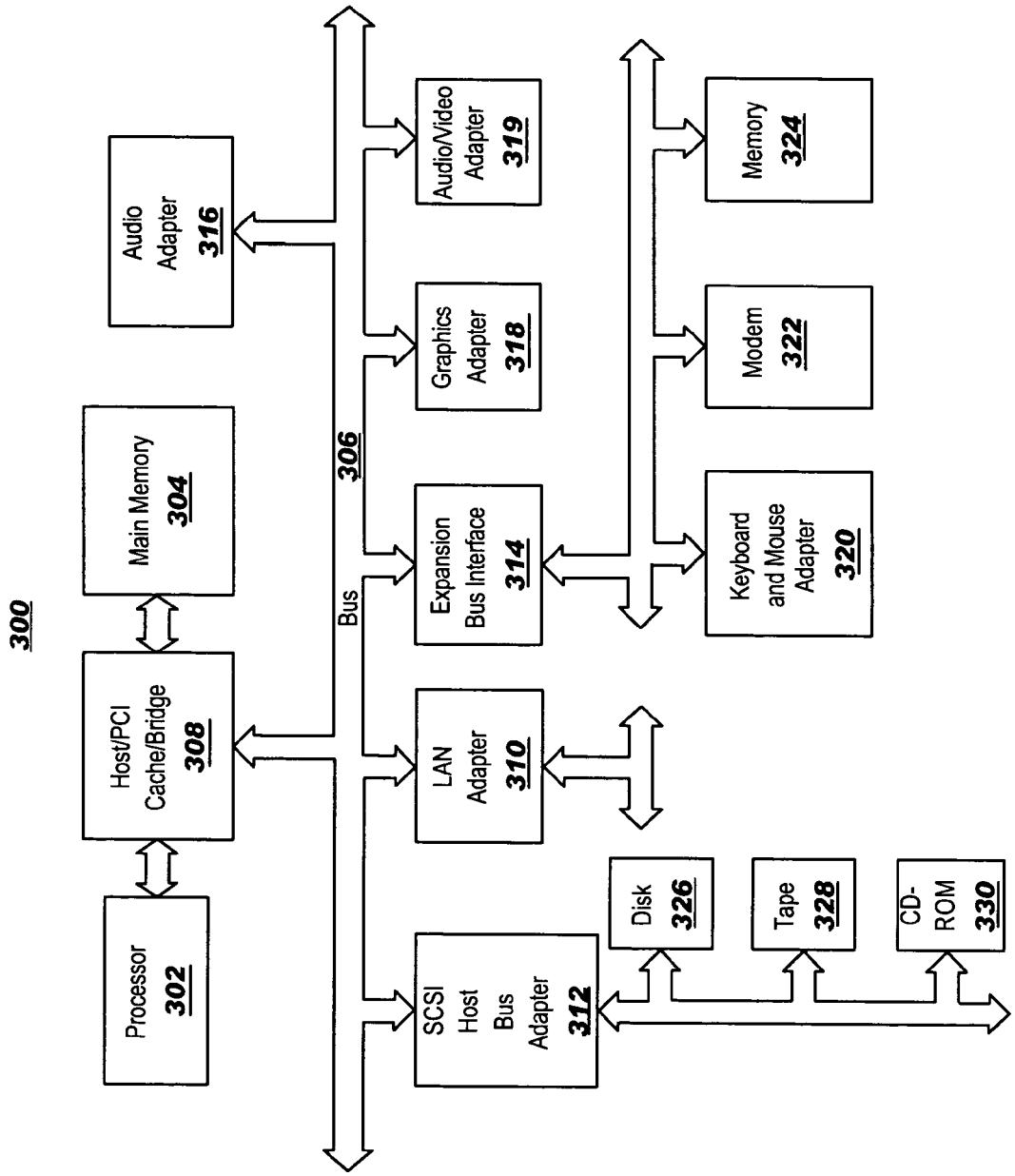
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for on demand tracking of applications. Tracking of applications include debugging, tracing and logging of applications. The present invention provides on demand notifications for a user of a data processing system to initiate debugging, tracing, or logging of a process of an application. An application may be executed on a server, such as iSeries eServer, a product available from International Business Machines Corporation, or on a client, such as data processing system 300 in FIG. 3.

The user of the data processing system may specify one or more units of execution or specific entry levels to initiate tracking. A unit of execution may be a program, module, or object of an application. Specific entry level may be a method of a program or an individual entry in a library.

After the build step is complete and the application is deployed in a user's data processing system, the user may specify one or more units of execution that are of interest using the mechanism of the present invention, for example, the unit of execution may be specified using a tree view of an IDE that provides a list of target objects identified on the user's data processing system.

A target object is a grouping of one or more entries that are accessible by the target system at run time. A target object includes, for example, an executable program, a library, an object, or a number of individual entries. Thus, a user may select an entire unit of execution, a specific entry point, or a collection of entry points that are of interest to the user using the list of target objects.

In a preferred embodiment, when the selection of target objects is made, each selected object may be assigned a marker, such as a service entry point. Other types of markers, such as break points, may also be used depending on the implementation. A service entry point is a marker, which a server recognizes when a selected object is invoked. The server may be, for example, data processing system 200 in FIG. 2. The service entry point may be a hardware or software entry point.

In the present invention, this marker may be implemented as a software entry point set for an individual entry or an entire module or program and may be identified by the system. For example, an entry point for an individual entry may be identified by the system using the first statement of the specified entry. An entry point for an entire module or program may be identified by the system using the first statement of all entries within the module or all modules within the program.

In addition, a list of entry points may be presented in a user interface for users to update or delete in the future. Each entry point may be specific to a user. The user-specific service entry point enables the system to scope on demand notifications to a user of interest.

When the user invokes an application on a Web server via a Web interface, the Web server processes the user's request and executes the application on the target system. The target system is the user's data processing system in this example. During execution, if a marked target object is encountered, a service entry is triggered and an event is sent to a registered event handler on the target system. The event handler of the target system is a routine that is registered to handle a specific event, such as when one or more selected units of execution are executed.

In turn, the event handler gathers information about the process that triggered this event. This information may include the process identifier and the IP address of the target system. Thus, instead of the user having prior knowledge of the process identifier, the event handler gathers the process identifier of the executing unit of interest for the user.

At the client system, an IDE that supports a debug user interface may be listening on a specific port. After gathering information including the process identifier, the event handler may communicate this information to the listening port. This port may be a port that is well known to both the IDE and the event handler, for example, port '8001'. Once this information is received by the IDE, a debug session for the target system may be initiated for the user to begin debugging or tracing the process. Alternatively, rather than initiating a debug session for the user, the event handler may log this information to a file, which the user may later retrieve and interpret.

Figure 4:
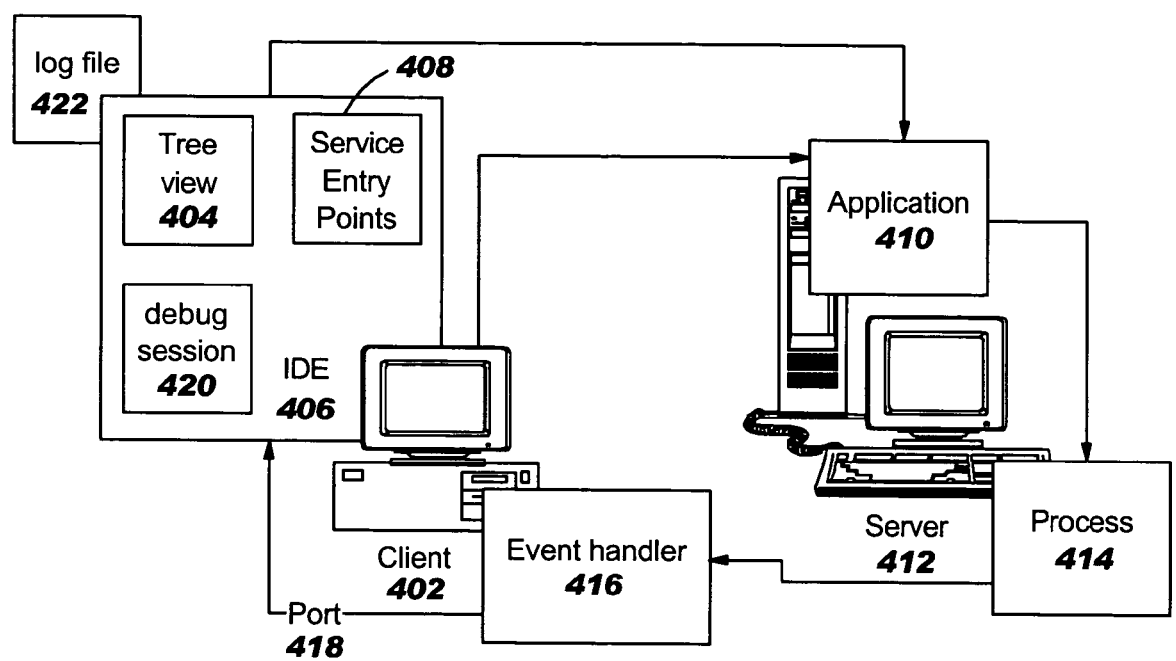
FIG. 4 is a diagram illustrating interactions between components of the present invention in accordance with a preferred embodiment of the present invention.

Turning now to FIG. 4, a diagram illustrating interactions between components of the present invention is depicted in accordance with a preferred embodiment of the present invention. As depicted in FIG. 4, a user on client 402 may identify or select one or more execution units of interest by using a list of target objects displayed in tree view 404 of IDE 406. The list of target objects are objects identified on client 402 after the build step is complete. Once execution units of interest are selected, entry points 408 are assigned for this user.

Later, the user on client 402 invokes application 410 on server 412. Application 410 is an application that executes on server 412. However, application 410 may also be a client application that executes on client 402. Upon receiving invocation of application 410 from client 402, server 412 may spawn process 414 to handle the client request. If one of entry points 408 assigned by the user is encountered in process 414, server 412 sends an event notification to event handler 416 on client 402. Event handler 416 gathers necessary information of process 414 including the process identifier and communicates the information to IDE 406 on client 402, which is listening on port 418.

Once IDE 406 receives the notification of information from event handler 416, IDE 406 initiates debug session 420 for user on client 402 to debug or trace application 410 running in process 414. Alternatively, the user on client 402 may also log the information to a file, such as log file 422 on client 402, and debug at a later time.

Figure 5:
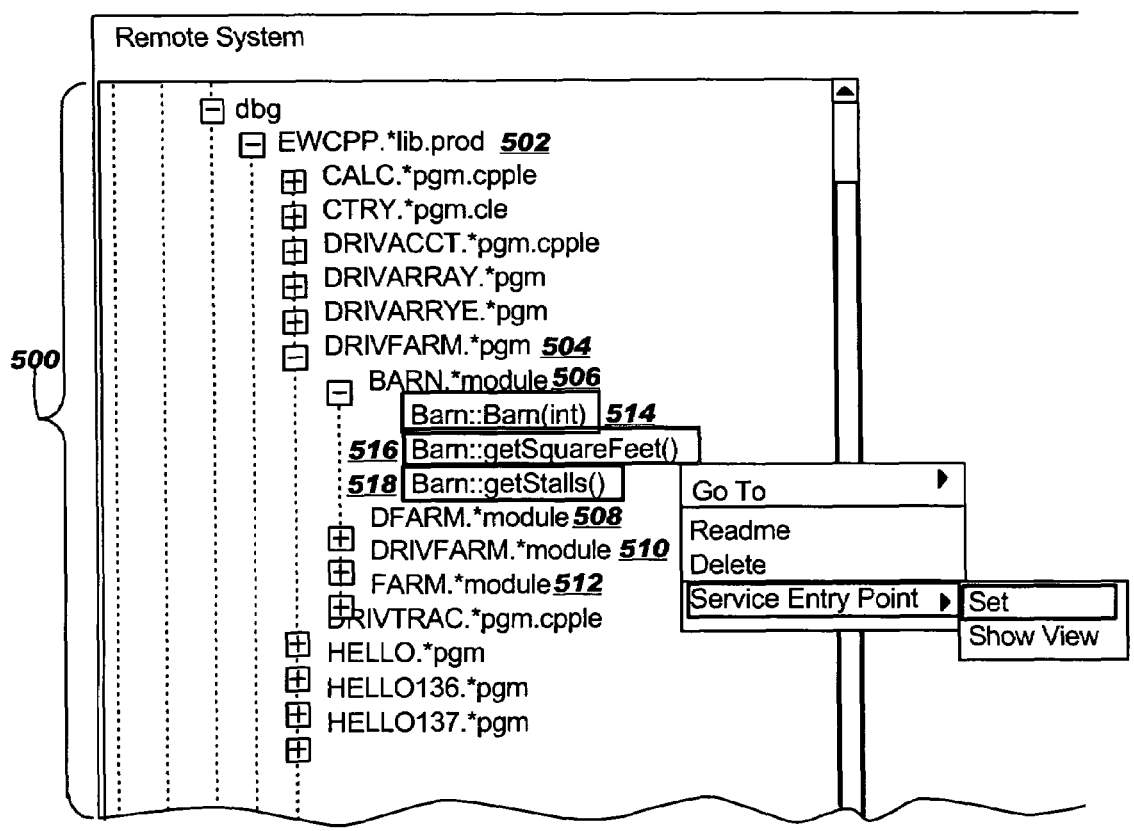
FIG. 5 is a diagram illustrating an exemplary user selection of units of execution in accordance with a preferred embodiment of the present invention.

Turning now to FIG. 5, a diagram illustrating an exemplary user selection of units of execution using the mechanism of the present invention is depicted in accordance with a preferred embodiment of the present invention. As depicted in FIG. 5, in this example implementation, the mechanism of the present invention may present a list of target objects on the user's data processing system using a tree view of an IDE, such as tree view 500. Tree view 500 includes a list of target objects that are identified on the target system. Each target object may be identified after the build step is complete and the application is deployed on the target system.

In addition to target objects that are identified for a single target system, tree view 500 may also include target objects that are identified for other hosts, including remote target hosts. This enables other users in a single server environment to debug, trace or log their application.

In this illustrative example, tree view 500 includes a library, EWCPP library 502. EWCPP library 502 includes a list of programs, such as DRIVFARM program 504. Within DRIVFARM program 504, there are a number of modules, which includes BARN module 506, DFARM module 508, DRIVFARM module 510, and FARM module 512. Within BARN module 506, there are a number of functions, Barn function 514, get square feet function 516, and get stalls function 518.

Using the mechanism of the present invention, a user may select one or more target objects at any level of tree view 500 to form a set of selected target objects. For example, a user may select EWCPP library 502, DRIVFARM program 504, BARN module 506, or Barn function 514. In addition, the user may select a combination of these target objects. In this example, the user selects Barn function 514, get square feet function 516, and get stalls function 518. Once the user selects one or more target objects, the mechanism of the present invention may assign each target object as an entry point.

Turning now to FIG. 6, a diagram illustrating an exemplary list of service entry points assigned by the mechanism of the present invention is depicted in accordance with a preferred embodiment of the present invention. As depicted in FIG. 6, in this example implementation, after the mechanism of the present invention assigns each selected target object in tree view 500 of FIG. 5 as a service entry point, a list of service entry points may be presented in a user interface, such as user interface 600.

In this illustrative example, user interface 600 includes service entry points 602, 604, and 606. Each service entry point identifies a target object as a library 608, a program 610, a module 612, or a procedure 614 for a given user ID 616. For a program, a program type 618 may also be identified.

Service entry point 602 identifies program DRIVACCT 620, which is within library EWCPP 622. Thus, in this example, the user selected the target object at the program level, which includes all modules in program DRIVACCT 620 and all procedures within each of the modules.

The selection of program DRIVACCT 620 is made by user 1 624, meaning that the system will trigger an event to user 1 624 when program DRIVACCT 620 is executed. This provides flexibility to scope notification of an event to a user of interest, since the system will only notify user 1 624 when program DRIVACCT 620 is executed. Other users within the single server environment are not notified.

Similarly, service entry point 614 identifies program EWICBL001 626, which is selected by user 2 628. Again, all modules and procedures within program EWICBL001 626 are selected by user 2 628 and the system will send notification to user 2 628 only when program EWICBL001 626 is invoked.

In addition to listing each service entry point, user interface 600 also allows a user to update or delete service entry points 602-606. Thus, using the mechanism of the present invention, selection of execution units may be scoped to a user of interest. Multiple users within a single server environment may alter selection of units of execution.

Later, when user 2 628 invokes an application on a Web server, the Web server processes the user's request and executes the application on user 2's data processing system. Since program EWICBL001 626 is assigned as service entry point 604, the server recognizes program 626 when it is encountered during execution of the application. When program 626 is encountered, service entry point 604 is triggered and an event is sent to a registered event handler on user 2's data processing system.

Upon detecting the event, the event handler gathers information about the process in which program EWICBL001 626 executes. This information includes the process identifier of the process, and the IP address of user 2's data processing system. In this way, the mechanism of the present invention may gather process identifiers necessary to initiate a debug session on user 2's data processing system even without knowledge of the process identifier ahead of time.

The event handler then notifies an IDE on user 2's data processing system that is listening on a specific port that an event has occurred and communicates gathered information including the process identifier to the listening port of the IDE. Upon receiving notification from the event handler, the IDE automatically initiates debugging, tracing or logging of the process.

Figure 7:
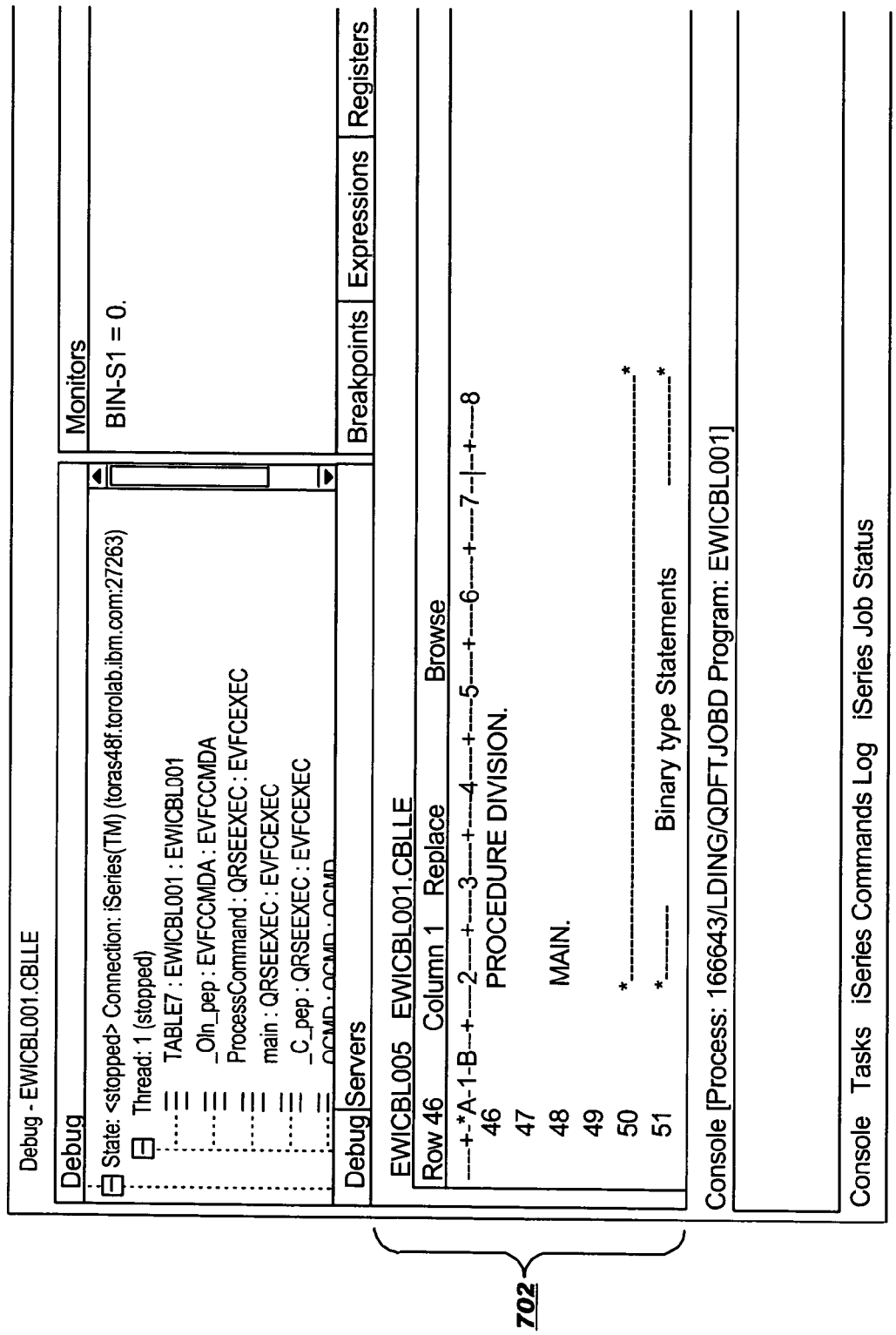
FIG. 7 is a diagram illustrating an exemplary debug session initiated in accordance with a preferred embodiment of the present invention.

Turning now to FIG. 7, a diagram illustrating an exemplary debug session initiated by the mechanism of the present invention is depicted in accordance with a preferred embodiment of the present invention. As depicted in FIG. 7, in this example implementation, debug session 700 is initiated automatically on the target system, such as user 2's data processing system, by the IDE when notification of an event is received from the event handler. Debug session 700 includes window 702, which represents the process in which program EWCIBL001 626 executes.

Thus, instead of a user having to initiate a debug session before the execution unit of interest is called, a debug session, such as debug session 700, may be initiated automatically by the IDE when the execution unit of interest is called using the mechanism of the present invention.

Figure 8:
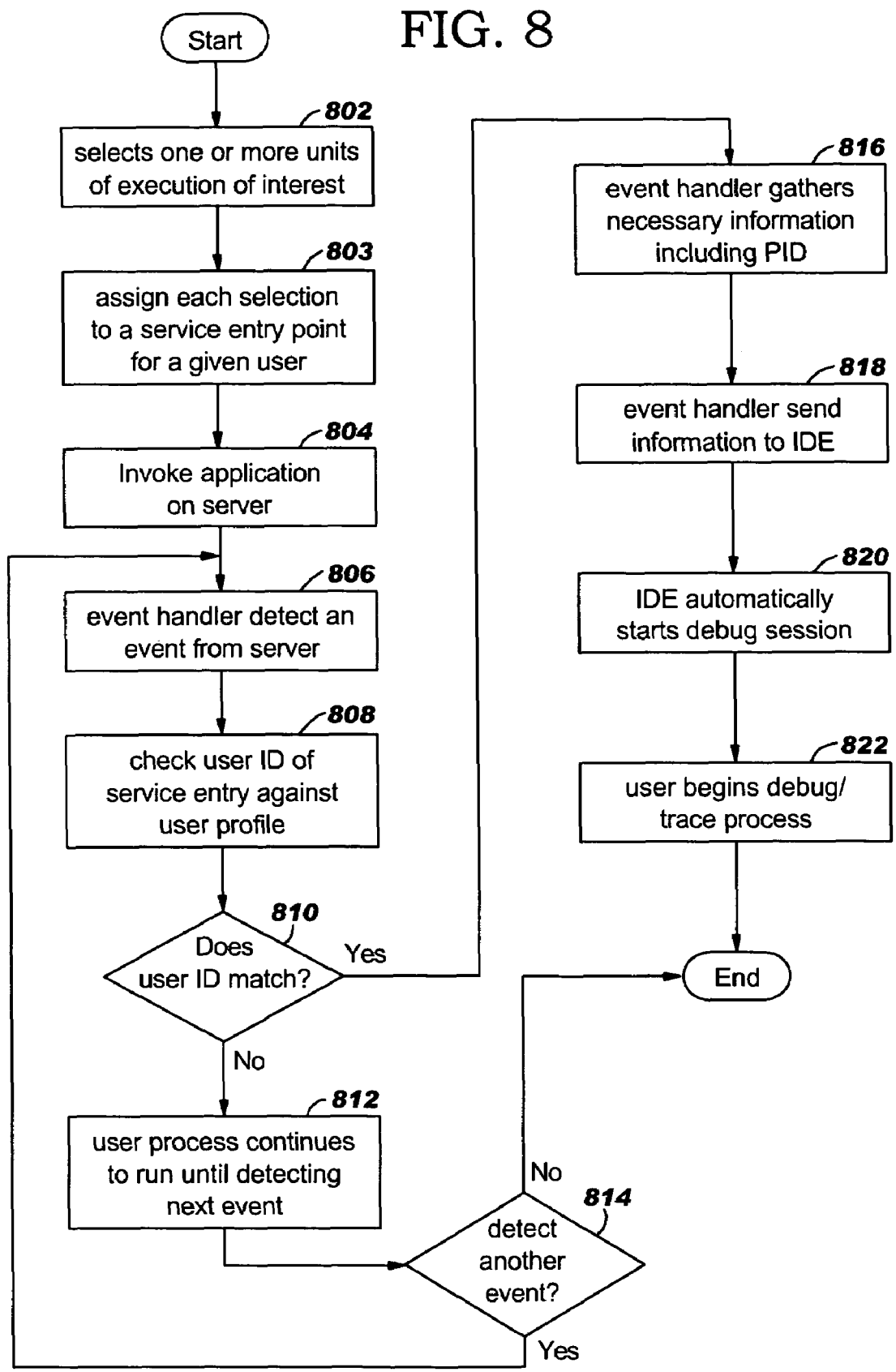
FIG. 8 is a flowchart of a process for on demand debugging, tracing, and logging of applications from the perspective of a user's data processing system in accordance with a preferred embodiment of the present invention.

Turning now to FIG. 8, a flowchart of a process for on demand debugging, tracing and logging of applications from the perspective of a user's data processing system is depicted in accordance with a preferred embodiment of the present invention. As depicted in FIG. 8, the process begins when the user selects one or more units of execution of interest (step 802). This may be accomplished by selecting one or more units of execution of interest from a list of target objects that are identified on the user's data processing system using a tree view of an IDE. A unit of execution may be any objects in the system, for example, a program, a module, an object, or a procedure. The target objects are identified once the build step is complete and the application is deployed on the user's data processing system.

Upon selection of one or more units of execution of interest, each selected target object is marked for the given user (step 803). Thus, in a single server environment, multiple users may be assigned his or her markers. Next, the user invokes the deployed application on the server (step 804). The application may be invoked via a Web interface and the server may be a Web server running on different hardware platform, such as, for example, WebSphere Application Server from International Business Machines Corporation.

Later, the event handler of the user's data processing system detects an event triggered on the server (step 806). An event is sent to the event handler upon triggering of a service entry when a selected target object is executed. The event handler is a routine that is registered with the server to handle a certain type of event.

Once the event is detected, the event handler checks the user ID of the service entry against the user profile of the user's data processing system (step 808). A determination is then made by the event handler as to whether the user ID matches the user profile (step 810). If the user ID does not match, the user process continues to run (step 812) and a determination is made as to whether another event is detected (step 814). If another event is detected, the process returns to step 806. Otherwise, the process terminates thereafter.

Turning back to step 810, if the user ID matches the user profile, the event handler gathers necessary information including the process identifier of the process that triggered the event (step 816). Necessary information may include the process identifier and IP address of the target system. The event handler may gather the process identifier from the operating system or other sources.

The event handler then sends the gathered information to a port that is listened by an IDE (step 818). With the necessary process identifier, the IDE automatically starts a debug session (step 820) and the user may begin debugging or tracing of the process (step 822) with the process terminating thereafter. Alternatively, the system may log the information to a file for later use.

Figure 9:
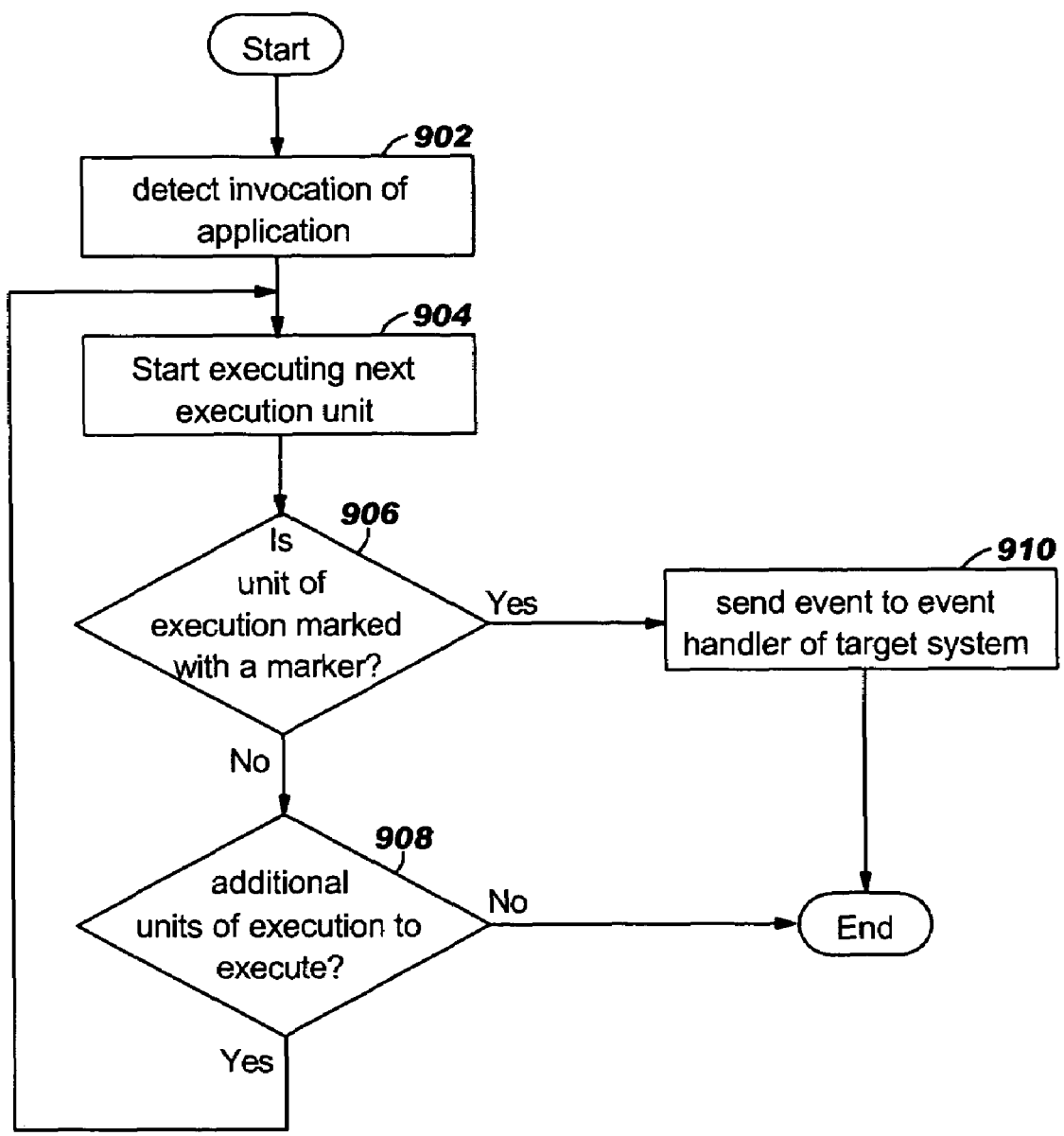
FIG. 9 is a flowchart of a process for on demand debugging, tracing, and logging of applications from the perspective of a server in accordance with a preferred embodiment of the present invention.

Turning now to FIG. 9, a flowchart of a process for on demand debugging, tracing, and logging of applications from the perspective of a server is depicted in accordance with a preferred embodiment of the present invention. As depicted in FIG. 9, the process begins when the server detects the invocation of an application (step 902). The invocation of the application is typically performed by a user. Next, the server starts executing the next unit of execution for the application (step 904). Examples of a unit of execution include a program, a module, and a procedure.

A determination is then made by the server as to whether the unit of execution currently executing is marked with a marker (step 906), such as an entry point. The determination may be made by examining a list of entry points or markers on the target system that are assigned to user selections. If the current execution unit is marked with a marker, the system sends an event to an event handler of the target system (step 910) and the process continues to step 908. If the current execution unit is not marked with a marker, the process terminates thereafter. From this point on, the user of the target system will gain control of the process.

At step 908, a determination is made as to whether there are additional units of execution to execute (step 908). If there are additional units of execution, the process returns to step 904 to start executing the next unit of execution. If there are no additional units of execution, the process terminates thereafter.

In summary, the present invention provides a method and apparatus for on demand debugging, tracing, and logging of applications. With the present invention, a user may specify a unit of execution of interest, which may encompass different levels of an application including programs, modules, objects, entries and procedures. In addition, a user may also use the present invention to initiate a debug session automatically when a selected unit of interest is executed in any process of the system. The initiation of the debug session may be performed without knowledge of the process identifier, or inserting waits in the source code. Furthermore, in a single server environment, a user of interest may be identified using the present invention in order to scope the notification of an event when the execution unit selected by the user is invoked.

Using the mechanism of the present invention, a user is not required to have knowledge of the process identifier ahead of time. A user is not required to modify source code to insert waits. A user is not required to search for the process identifier when the process is created. A user is not required to initiate debug session prior to execution of the unit of interest. Once the unit of interest is executed, the present invention automatically initiates the debug session. Moreover, the present invention allows multiple users to debug within a single server environment so long as the server spawns different processes for each user request.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for on demand tracking of applications, the method comprising:
    providing a list of target objects associated with the applications;
    selecting one or more units of execution of interest from the list of target objects to form a set of selected target objects;
    assigning a corresponding marker to each target object in the set of selected target objects prior to execution of the applications, wherein each corresponding marker assigns each target object in the set of selected target objects to a corresponding user identifier of a corresponding user;
    responsive to executing the applications to execute at least one target object from the set of selected target objects using the corresponding marker for the at least one target object, identifying the corresponding marker and corresponding user for a target object in the set of selected target objects and triggering an event for an event handler associated with the corresponding user;
    responsive to detecting the event from a server triggered by a process for an application, invoking the event handler to gather information from the process, wherein the information comprises a corresponding internet protocol address of a data processing system of the corresponding user and a corresponding process identifier;
    sending the information to a development environment; and
    responsive to receiving the information on the data processing system of the corresponding user, initiating a debug session automatically using the information in the development environment of the corresponding user.

2. The method of claim 1, wherein the list of target objects includes at least one of a library, program, module, object, procedure and entry.

3. The method of claim 2, wherein library includes at least one program, the program includes at least one module and the module includes at least one of an object, an entry and a procedure.

4. The method of claim 1, wherein the one or more units of execution of interest includes any target object and a combination of any of the target objects.

5. The method of claim 1, wherein the list of target objects is identified after a build step is complete and an application is deployed.

6. The method of claim 1, wherein the list of target objects is displayed in at least one of a tree view and a table view of the development environment.

7. The method of claim 1, wherein the one or mote units of execution of interest is selected by a user of the data processing system.

8. The method of claim 1, wherein the event handler is a routine that handles a certain type of event.

9. The method of claim 1, wherein the sending step includes:
sending the process identifier to a port shared with the development environment.

10. The method of claim 1, wherein the initiating step includes:
initiating a user interface that displays the process executing one or more target objects in the set of selected target objects.

11. The method of claim 1, further comprising:
responsive to receiving the information, logging the information automatically to a log file.

12. The method of claim 1, wherein the debug session is used by a the corresponding user for tracking the application, and wherein tracking includes at least one of debugging and tracing.

13. The method of claim 1, wherein the corresponding marker is one of a service entry point and a breakpoint.

14. A method in a server for processing on demand tracking of applications, the method comprising:
detecting a request from one of a plurality of data processing systems to invoke one or more applications;
responsive to detecting the request, executing a unit of execution of the one or more applications to execute at least one target object from a set of selected target objects using a corresponding marker for at least one target object; and
determining the unit of execution is assigned a corresponding marker, wherein each corresponding marker is assigned to a corresponding user of one of the plurality of data processing systems;
responsive to a determination that the unit of execution is assigned a corresponding marker wherein each corresponding marker is assigned to a corresponding user of one of the plurality of data processing systems, sending an event to an event handler associated with the corresponding user of the one of the plurality of data processing systems, wherein the event handler gathers information comprising a corresponding internet protocol address of a data processing system, of the corresponding user, of one of the plurality of data processing systems and a corresponding process identifier of the unit of execution;
sending the information to a development environment; and
responsive to receiving the information on the data processing system of the corresponding user, initiating a debug session automatically using the information in the development environment of the corresponding user.

15. The method of claim 14, wherein the determining step comprises:
determining whether the user identifier of the corresponding marker matches a user profile of the one of the plurality of data processing systems.

16. A data processing system for on demand tracking of applications, the data processing system comprising:
a system bus;
a memory connected to the system bus, wherein the memory contains computer executable instructions;
a processor connected to the bus, wherein the processor executes the computer executable instructions to direct the data processing system to:
provide a list of target objects associated with the applications;
select one or more units of execution of interest from the list of target objects to form a set of selected target objects;
assign a corresponding marker to each target object in the set of selected target objects prior to execution of the applications, wherein each corresponding marker assigns each target object in the set of selected target objects to a corresponding user identifier of a corresponding user;
responsive to executing the applications to execute at least one target object from the set of selected target objects using the corresponding marker for the at least one target object, identifying a corresponding marker and corresponding user for a target object in the set of selected target objects and triggering an event for an event handler associated with the corresponding user;
invoke the event handler to gather information from a process, responsive to detecting the event from a server triggered by the process for an application, wherein the information comprises a corresponding internet protocol address of the data processing system, of the corresponding user, and a corresponding process identifier;
send the information to a development environment and
responsive to receiving the information on the data processing system of the corresponding user, initiate a debug session automatically using the information in the development environment of the corresponding user.

17. The data processing system of claim 16, wherein the one or more units of execution of interest is selected by the corresponding user of the data processing system.

18. The data processing system of claim 16, wherein the processor executes the computer instructions to direct the data processing to initiate a debug session further directs the data processing system to:
initiate a user interface that displays the process executing one or more target objects in the set of selected target objects.

19. A computer program product for on demand tracking of applications, the computer program product comprising:
a computer readable physical storage medium having instructions, executable by the computer, stored thereon, the instructions comprising:
first instructions for providing a list of target objects associated with the applications;
second instructions for selecting one or more units of execution of interest from the list of target objects to form a set of selected target objects;
third instructions for assigning a corresponding marker to each target object in the set of selected target objects prior to execution of the applications, wherein each corresponding marker assigns each target object in the set of selected target objects to a corresponding user identifier of a corresponding user;
fourth instructions responsive to executing the applications to execute at least one target object from the set of selected target objects using the corresponding marker for the at least one target object for identifying a corresponding marker and corresponding user for a target object in the set of selected target objects and triggering an event for an event handler associated with the corresponding user;

fifth instructions for invoking the event handler to gather information from a process, responsive to detecting the event from a server triggered by the process for an application, wherein the information comprises a corresponding internet protocol address of a data processing system of the corresponding user and a corresponding process identifier;

sixth instructions for sending the information to a development environment; and seventh instructions, responsive to receiving the information on the data processing system of the corresponding user, for initiating a debug session automatically using the information, in the development environment of the corresponding user.

* * * * *

UNITED STATES PATENT AND TRADEMARK OFFICE
CERTIFICATE OF CORRECTION

PATENT NO. : 7,581,211 B2
APPLICATION NO. : 10/890665
DATED : August 25, 2009
INVENTOR(S) : Babineau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Fourteenth Day of September, 2010

David J. Kappos
*Director of the United States Patent and Trademark Office*